United States Patent
Schramm

(10) Patent No.: US 10,756,328 B2
(45) Date of Patent: Aug. 25, 2020

(54) PREFORMED SILICON-BASED NEGATIVE ELECTRODE AND METHOD FOR ITS MANUFACTURE

(71) Applicant: Volkswagen Aktiengesellschaft, Wolfsburg (DE)

(72) Inventor: Linda-Susann Schramm, Braunschweig (DE)

(73) Assignee: VOLKSWAGEN AKTIENGESELLSCAHFT, Wolfsburg (DE)

(*) Notice: Subject to any disclaimer, the term of this patent is extended or adjusted under 35 U.S.C. 154(b) by 0 days.

(21) Appl. No.: 16/043,347

(22) Filed: Jul. 24, 2018

(65) Prior Publication Data

US 2019/0027736 A1 Jan. 24, 2019

(30) Foreign Application Priority Data

Jul. 24, 2017 (DE) .................. 10 2017 212 680

(51) Int. Cl.
| | |
|---|---|
| H01M 4/04 | (2006.01) |
| H01M 4/38 | (2006.01) |
| H01M 4/62 | (2006.01) |
| H01M 10/0525 | (2010.01) |
| H01M 10/44 | (2006.01) |
| H01M 4/02 | (2006.01) |

(52) U.S. Cl.
CPC .......... *H01M 4/044* (2013.01); *H01M 4/386* (2013.01); *H01M 4/62* (2013.01); *H01M 10/0525* (2013.01); *H01M 10/446* (2013.01); *H01M 2004/027* (2013.01)

(58) Field of Classification Search
CPC .......... H01M 4/04; H01M 4/044; H01M 4/38; H01M 4/386; H01M 4/62; H01M 10/0525
See application file for complete search history.

(56) References Cited

U.S. PATENT DOCUMENTS

| | | |
|---|---|---|
| 8,801,810 B1 | 8/2014 | Cui et al. |
| 9,293,770 B2 | 3/2016 | Todoriki et al. |
| 2013/0327648 A1 | 12/2013 | Grant et al. |
| 2016/0020491 A1 | 1/2016 | Dai et al. |
| 2016/0172665 A1 | 6/2016 | Zhou et al. |
| 2016/0172710 A1 | 6/2016 | Liu et al. |
| 2017/0162859 A1* | 6/2017 | Yang ................. H01M 4/38 |

FOREIGN PATENT DOCUMENTS

| | | |
|---|---|---|
| DE | 11 2015 000 403 T5 | 11/2016 |
| WO | WO 2015126649 | 8/2015 |

OTHER PUBLICATIONS

Search report for German Patent Application No. 10 2017 212 680.9, dated Feb. 28, 2018.
Search report for European Patent Application No. 18 18 4524, dated Dec. 21, 2018.

* cited by examiner

*Primary Examiner* — Karie O'Neill Apicella
(74) *Attorney, Agent, or Firm* — Pearl Cohen Zedek Latzer Baratz LLP

(57) ABSTRACT

The present invention relates to a method for manufacturing a silicon-based negative electrode, a method for manufacturing a lithium-ion battery from a preformed silicon-based negative electrode, and a lithium-ion battery thus obtained.

15 Claims, 2 Drawing Sheets

PREFORMED SILICON-BASED NEGATIVE ELECTRODE AND METHOD FOR ITS MANUFACTURE

CROSS REFERENCE TO RELATED APPLICATION

This application claims priority German Patent Application No. 10 2017 212 680.9, filed Jul. 24, 2017, the entire contents of which are hereby incorporated by reference.

FIELD OF THE INVENTION

The present invention relates to silicon-based negative electrodes, in particular having reduced initial irreversible capacity loss, in particular for use in batteries, methods for its manufacture, and batteries and devices that contain the silicon-based negative electrodes.

BACKGROUND OF THE INVENTION

Lithium-ion batteries (LIBs) are presently considered as the key technology in electromobility. They must be highly optimized with regard to their cost, weight, energy density, service life, safety, and charge life.

By use of innovative electrode materials it is possible to increase the energy density of lithium-ion batteries (135 Wh/kg (2013) to 280 Wh/kg (2018)), and thus to significantly increase the cruising range of electric vehicles (from 190 km to 500 km). Silicon is a promising active material in this regard. Silicon has a capacity ten times that of commercially used graphite, and has a similarly low lithiation potential (0.5 V vs. lithium-lithium$^+$). Since silicon is the second most common material in the earth's crust and thus has low production costs, and the material is safe to handle and is nontoxic, it is attractive from an industrial standpoint.

It is known that during the first cyclings of a battery, a solid electrolyte interface (SEI), i.e., a boundary layer between the negative electrode and the electrolyte, is formed due to reductive decomposition of various electrolyte components such as solvents, additives, and impurities; this solid electrolyte interface is not thermodynamically or electrochemically stable at the voltages achieved.

The formation of the SEI is on the one hand essential for the functionality and the service life of lithium-ion batteries, since in the ideal case it has good ionic conductivity and at the same time has an electrically insulating effect. Due to its kinetically limiting effect, it largely suppresses further decomposition of the electrolyte and counteracts further capacity losses. On the other hand, the SEI protects the structure of the active material (graphite) from exfoliation, and thus protects the cell from significant capacity losses.

However, during the formation of the SEI, irreversible capacity loss which is attributed to the formation also always occurs.

In the case of commercial graphite electrodes, the irreversible capacity loss due to the SEI formation is very low, at approximately 2 to 5%, in relation to the silicon-containing negative electrodes, at 20 to 80%.

For the silicon-containing negative electrodes, which are particularly susceptible to irreversible capacity loss, a distinction must be made between two different types of irreversible capacity loss. In addition to the capacity loss during the initial formation, i.e., an initial capacity loss, capacity loss due to "breathing" during the cycling also occurs.

Therefore, a fundamental challenge to the commercial application of silicon-containing negative electrodes is the enormous change in volume, i.e., the breathing, of the material during the lithiation and delithiation processes ($Li_4Si_{15}$: 280%-300%, compared to $LiC_6$: 10-11%). The breathing of the silicon-containing negative electrode results in pulverization of the particles, and thus, additional problems. In particular, it has catastrophic effects on the preservation of the electrode architecture, which occur in particular with high surface loading. This causes contact losses within the electrode and between the electrode and the current collector, and is reflected in impairment of the electrical conductivity. In addition, it results in constant fracturing and growth of the SEI. This in turn results in continuous Li ion consumption and increasing internal resistance in the cell, and thus a lower coulombic efficiency (CE) and inadequate cycle stability.

The initial capacity loss is greatly dependent on which silicon species is used. The species may differ, among other criteria, in the type of material (silicon alloy, silicon composite, silicon oxide, coated silicon), in the shape, in the crystallinity (amorphous, crystalline, or polycrystalline), and in the particle size (nano range, micro range, size distribution), and thus in the SEI surface. In particular particles in the nano range have an active surface and thus a higher initial capacity loss. In this case, the SEI is particularly thin due to a constant current that is better distributed over the active surface.

DE 11 2015 000 403 T5 discloses a method for improving the performance of a silicon-based negative electrode by prelithiation of the silicon-based negative electrode in an electrolyte containing dimethoxyethane, fluoroethylene carbonate, and a lithium salt. In particular, the preformation of an SEI on the silicon-based negative electrode in the prelithiation electrolyte by applying a voltage for a period of 1 to 100 hours is disclosed.

U.S. Pat. No. 9,293,770 B2 discloses a method for coating a silicon-based negative electrode with a graphene oxide layer. According to this method, the graphene oxide layer is applied to a silicon-based negative electrode by electrophoresis. Current is applied at a voltage of 0.5 V to 2.0 V for at least 0.5 min to 30 min.

U.S. Pat. No. 8,801,810 B1 discloses a method for manufacturing a lithium-ion battery, wherein the lithium-ion battery is first charged up to a certain voltage at a constant C-rate, then held at constant voltage until the current intensity reaches a specified value. The lithium-ion battery is subsequently stored for a given period of time, with a possible storage time of 0 to 12, 24, 48, and 72 hours. The lithium-ion battery is subsequently discharged to a certain voltage at a constant C-rate, and the cell is then further discharged at constant voltage until a specified capacity value is reached.

SUMMARY OF THE INVENTION

The technical object of the present invention is to provide electrodes and batteries that do not have the above-mentioned disadvantages, and that in particular allow a reduction in the initial irreversible capacity loss and a reduction in the time required for the SEI formation.

This technical object is achieved by the present invention by providing the teaching of the independent claims.

According to the invention, a method for manufacturing at least one silicon-based negative electrode is provided, wherein the method comprises the following method steps:

a) Providing at least one silicon-based negative electrode precursor, an electrolyte, and at least one lithium-based counter electrode,
b) Applying at least three successive constant voltages of 1.2 V-1.8 V, 400 mV-800 mV, and 200 mV-390 mV, respectively, between the at least one silicon-based negative electrode precursor and the at least one lithium-based counter electrode for a period of at least 35 minutes in each case, and
c) Obtaining the silicon-based negative electrode.

The present procedure is thus characterized in that in a first method step a) a silicon-based negative electrode precursor, an electrolyte, and at least one lithium-based counter electrode are provided, in particular in a housing containing these components, for example in a galvanic cell, optionally together with a separator, wherein in a subsequent method step b) at least three successive, in particular directly successive, constant voltages of 1.2 V-1.8 V, 400 mV-800 mV, and 200 mV-390 mV, respectively, are applied between the at least one silicon-based negative electrode precursor and the at least one lithium-based counter electrode for a period of at least 35 minutes in each case, in order to obtain in a subsequent method step c) a silicon-based negative electrode, also referred to below as a preformed silicon-based negative electrode. According to the invention, the preforming is used to form an SEI on the obtained silicon-based electrode, which, preferably after removal from the electrolyte, washing, and drying, may then be used for manufacturing a cell, in particular a battery.

The procedure according to the invention preforms a silicon-based negative electrode precursor in a process upstream from the subsequent cell formation. The irreversible capacity loss may thus already be greatly reduced prior to the actual cycling, and the relative capacity greatly increased In addition, in one preferred embodiment the procedure according to the invention may be used to significantly shorten the subsequent formation time for the SEI, for example to 1 day or less.

In one particularly preferred embodiment, the method according to the invention provides the method sequence a), b), c) chronologically in this exact order. In another embodiment, at least two of the stated method steps, in particular the method steps b) and c), may be carried out simultaneously or partially overlapping with one another.

In one particularly preferred embodiment, further method steps may be carried out before, between, and/or after the method steps a), b), c). In another preferred embodiment, it may be provided that the method according to the invention constitutes solely the method steps a), b), c), without carrying out steps in between. In one particularly preferred embodiment, a procedure may be provided according to which the method steps a), b), c) are carried out without carrying out steps in between and without carrying out subsequent steps.

In conjunction with the present invention, the "negative electrode" is understood to mean the electrode that functions as an anode during discharging and as a cathode during charging, and the "positive electrode" is understood to mean the electrode that functions as a cathode during discharging and as an anode during charging.

In conjunction with the present invention, an "active material" of an electrode is understood to mean the material used to receive or discharge lithium ions, in particular silicon, graphite, or both in the case of a negative electrode, or in particular lithium metal oxides in the case of a positive electrode.

In conjunction with the present invention, the "electrode material" is understood to mean the material that coats the electron-conducting electrode support of an electrode, and in particular that may be composed of active material, binder, and optionally further substances such as conductive additives.

In conjunction with the present invention, the term "binder" is understood to mean a single binder or a mixture of various binders as binder components; in particular, the binder contains various binder components and optionally further additives.

In conjunction with the present invention, a "silicon-based negative electrode precursor" is understood to mean a structure that is suitable as an electrode and that includes an electrode material, in particular active material, which preferably includes silicon or is made of same, situated on an electron-conducting electrode support.

In one particularly preferred embodiment, active material, a binder, and optionally further substances such as conductive additives are present on the electrode support as electrode material.

In one particularly preferred embodiment, the active material includes silicon and graphite.

In one particularly preferred embodiment, the silicon-based negative electrode precursor includes, and is preferably made of, silicon as active material or silicon and graphite as active material, and in each case a binder and optionally further substances such as conductive additives.

In one preferred embodiment, the silicon-based negative electrode precursor is a precursor of a silicon-based negative composite electrode.

In one preferred embodiment, the silicon-based negative electrode is an electrode containing at least 5 wt %, preferably at least 10 wt %, preferably at least 20 wt %, preferably at least 30 wt %, preferably at least 40 wt %, preferably at least 50 wt %, preferably at least 60 wt %, preferably at least 70 wt %, preferably at least 80 wt %, silicon, in each case based on the total weight of the electrode material.

In conjunction with the present invention, percentages given for components of the electrode material are understood to mean weight percentages unless stated otherwise.

In one preferred embodiment, the silicon-based negative electrode is an electrode which in addition to silicon contains graphite as active material, and wherein the graphite is present in a quantity of at least 5 wt %, preferably at least 10 wt %, preferably at least 20 wt %, preferably at least 30 wt %, preferably at least 40 wt %, preferably at least 50 wt %, preferably at least 60 wt %, preferably at least 70 wt %, preferably at least 80 wt %, graphite, in each case based on the total weight of the electrode material.

In one particularly preferred embodiment, the quantity of silicon present in the silicon-based negative electrode together with graphite adds up to 100 wt % of the active material present in the electrode.

In one particularly preferred embodiment, in addition to the active material the electrode material of the silicon-based negative electrode contains binder, preferably in a quantity of at least 1 wt %, preferably at least 2 wt %, preferably at least 3 wt %, preferably at least 4 wt %, preferably at least 5 wt %, preferably at least 6 wt %, preferably at least 7 wt %, preferably at least 8 wt %, in each case based on the total weight of the electrode material.

According to the invention, the term "lithium-based counter electrode" is understood to mean a positive lithium-based electrode preferably containing at least 70 wt %, preferably at least 80 wt %, preferably at least 90 wt %, preferably 100 wt %, lithium or lithium compound, in each case based on the total weight of the electrode material.

The active material of the lithium-based counter electrode preferably includes at least one lithium metal oxide compound such as lithium cobalt dioxide ($LiCoO_2$), lithium manganese dioxide ($LiMnO_2$), lithium manganese tetraoxide ($LiMn_2O_4$), lithium nickel manganese cobalt oxide ($LiNi_{0.33}Mn_{0.33}Co_{0.33}O_2$), or a combination thereof, or is made of one or more of these components.

In one particularly preferred embodiment, the active material of the lithium-based counter electrode includes high-voltage spinel ($LiMn_{1.5}Ni_{0.5}O_4$), a high-energy stacked compound ($Li_2MnO_3$—$LiNO_2$ (N=Mn, Cr, Co, Ni), lithium metal phosphate ($LiMPO_4$ (M=Mn, Fe, Co), or a combination thereof, or is made of one or more of these components.

In one preferred embodiment of the present invention, in method step b) the at least three successive, constant voltages are applied directly one after the other, or via voltage interruptions are applied separately, one after the other.

In one preferred embodiment, in method step b) the at least three successive, constant voltages are respectively 1.3 to 1.6 V, in particular 1.5 V, 500 to 700 mV, in particular 600 mV, and 200 to 350 mV, in particular 300 mV.

In one particularly preferred embodiment, in method step b) the at least three successive, constant voltages are applied for at least 35 minutes, at least 45 minutes, at least 1 hour, or at least 2 hours.

In one preferred embodiment, in method step b) the at least three successive, constant voltages are each applied for 35 to 45 minutes, in particular 35 to 60 minutes, in particular 1 to 1.5 hours, in particular 1 to 2, 3, 4, 5, 6, 7, 8, 9, 10, 11, 12, 13, or 14 hours, in particular for 1.5 hours to 3, 4, 5, 6, 7, 8, 9, 10, 11, 12, 13, or 14 hours.

In one preferred embodiment, in method step b) the at least three successive, constant voltages are each applied for the same or different periods of time.

In one preferred embodiment, in method step b) the at least three successive, constant voltages are each applied for exactly 35 minutes to 4.5 hours, in particular exactly 1 to 2.5 hours, in particular exactly 2 hours.

In one preferred embodiment, the current applied in method step b) corresponds to a C-rate of C/5 to C/20.

In one preferred embodiment, the current applied in method step b) corresponds to a C-rate of C/10.

According to the invention, the term "C-rate" is understood to mean the relative charging current or discharging current, based on the theoretical specific capacity of the at least one silicon-based negative electrode. A charging current of C/5, for example, means that a galvanic cell having a capacity of 1 Ah is charged at ⅕ A.

In one preferred embodiment of the present invention, the silicon-based negative electrode obtained in method step c) is obtained after washing the electrode precursor, treated in step b), with an organic wash solution, in particular for removal of electrolyte, and preferably with subsequent drying.

In one preferred embodiment, the organic wash solution is selected from the group comprising an electrolyte, electrolyte components such as salts or additives, ethylene carbonate (EC), propylene carbonate (PC), diethyl carbonate (DEC), dimethyl carbonate (DMC), fluoroethylene carbonate (FEC), difluoroethylene carbonate (DFEC), vinylene carbonate (VC), vinyl ethylene carbonate (VEC), ethylene methyl carbonate (EMC), and mixtures thereof.

In one preferred embodiment of the present invention, after method step c), i.e., after obtaining the silicon-based negative electrode, for example after washing carried out within the scope of method step c) or also directly after carrying out method step b), a cycling, in particular at least one cycling, in particular 2, 3, 4, 5, 6, 7, 8, 9, 10, or more cyclings, is/are carried out.

In conjunction with the present invention, an "electrolyte" is understood to mean a composition that contains, in particular is made of, at least one aprotic nonaqueous solvent, at least one lithium salt, and optionally further substances.

The at least one aprotic nonaqueous solvent is preferably selected from the group comprising propylene carbonate (PC), ethylene carbonate (EC), dimethyl carbonate (DMC), diethyl carbonate (DEC), ethylene methyl carbonate (EMC), fluoroethylene carbonate (FEC), difluoroethylene carbonate (DFEC), vinylene carbonate (VC), vinyl ethylene carbonate (VEC), and a combination thereof.

The at least one lithium salt is preferably selected from the group comprising lithium hexafluorophosphate, lithium tetrafluoroborate, lithium perchlorate, lithium hexafluoroarsenate, lithium dioxalatoborate, lithium difluorooxalatoborate, lithium fluorooxalatoborate, lithium nitrate, lithium bis(fluorosulfonyl)imide, and a combination thereof.

In one particularly preferred embodiment, the present invention further relates to electrodes, in particular silicon-based negative electrodes, that are manufacturable by a method according to the invention.

In one particularly preferred embodiment, the present invention further relates to methods for manufacturing half cells, cells, or batteries, wherein silicon-based negative electrodes according to the invention are installed in a customary manner in half cells or cells, in particular cells together with further cell components, and half cells and batteries that contain electrodes according to the invention are obtained.

In one particularly preferred embodiment, the present invention therefore further relates to half cells, cells, and batteries, in particular lithium-ion batteries, containing at least one cell having at least one electrode according to the invention, in particular an electrode that is manufacturable by one of the methods according to the invention.

According to the invention, the term "lithium-ion battery" is understood to mean a primary or also a secondary lithium-ion battery, preferably a secondary lithium-ion battery. A primary lithium-ion battery is a nonrechargeable lithium-ion battery, and a secondary lithium-ion battery is a rechargeable lithium-ion battery.

In one particularly preferred embodiment, the batteries include pouch cells, button cells, or prismatic cells.

In one particularly preferred embodiment, the present invention further relates to devices containing at least one electrode according to the invention, in particular at least one battery according to the invention, in particular robots or electric vehicles, for example electrically driven automobiles, hybrid vehicles, or e-bikes, or electric aircraft such as drones or satellites, electrically operated watercraft such as recreational craft, underwater vehicles, and model ships, or portable devices such as lamps, or communication and/or entertainment devices such as telephones, smart phones, laptops, notebooks, and tablets.

Further advantageous embodiments result from the subclaims.

BRIEF DESCRIPTION OF THE DRAWINGS

The invention is explained in greater detail with reference to the following examples and associated figures.

The figures show the following.

DETAILED DESCRIPTION OF THE INVENTION

Examples

Example 1

Figure 1:
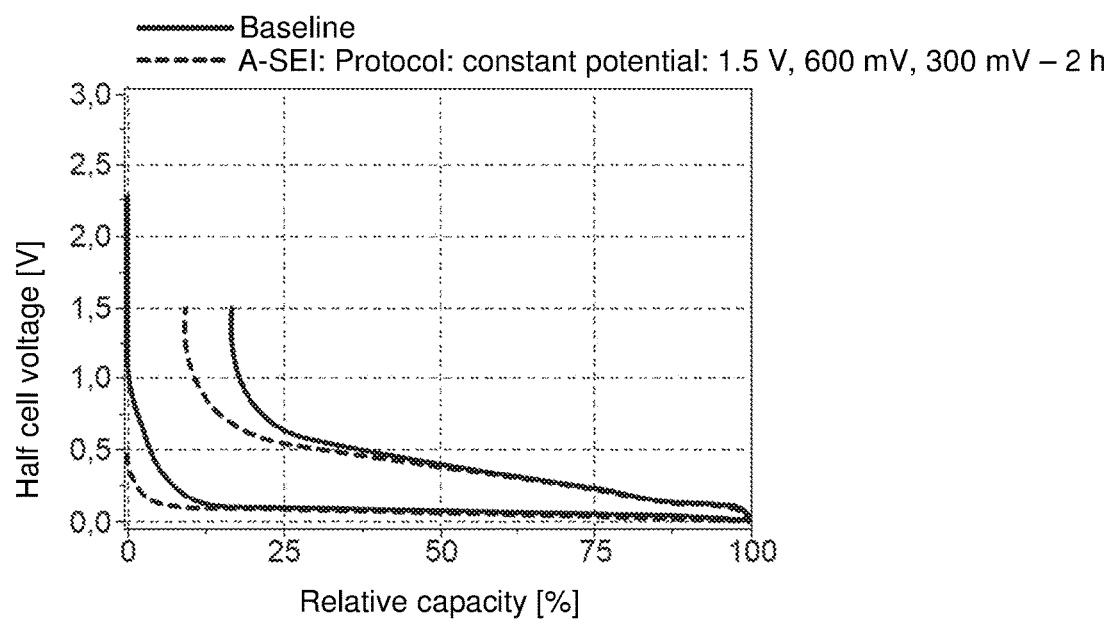
FIG. 1 shows the half cell voltage in volts in relation to the relative capacity (in percent (%)) during the first formation cycle. A silicon-based negative electrode according to the invention (A-SEI, dashed line) obtained in method step c) is compared to a silicon-based negative electrode (baseline, solid line) not according to the invention, namely, not preformed. The half cell voltage in relation to the relative capacity during lithiation (the left line in each case) and delithiation (the right line in each case) is illustrated.

1.1 The following formulation was used for manufacturing the electrodes:

20 wt % silicon (Nanostructured and Armorphous Material Inc.—Si, 98+%, 30-50 nm);

60 wt % graphite (Imerys—C-NERGY™ SFG6)

12 wt % carbon black (Imerys—C-NERGY™ SUPER C65)

8 wt % binder (carboxymethyl cellulose (700,000 g/mol): poly(acrylic acid) (450,000 g/mol):poly(acrylic acid-co-maleic acid) (350 g/mol), 1:1:1).

1.2 These solids, with the exception of the binder, were initially combined with tungsten carbide spheres (electrode support) in dissolver, and subsequently diluted by adding the binder in two steps, and the viscosity was adjusted, wherein the pH of the paste obtained was 3.

1.3 The electrode precursors manufactured in this way were preformed as follows.

A button cell was opened, the electrode precursor was inserted, and voltages of 1.5 V, then 600 mV, and lastly 300 mV, were applied for two hours in each case and held constant. Metallic lithium was used as a counter electrode or sacrificial anode. The applied current corresponded to a C-rate of C/10.

1.4 The silicon-based negative electrode preformed in this way was removed from the button cell, washed with dimethyl carbonate, and installed in another button cell for testing.

1.5 As a comparative electrode, an electrode with the same formulation and manufacturing method according to paragraphs 1.1, 1.2, and 1.4 was manufactured (referred to as baseline), but without carrying out preforming according to paragraph 1.3.

1.6 The electrode that was preformed according to the invention as well as the electrode that was not preformed according to the invention were examined with regard to their half cell voltage and their capacity loss in the first formation cycle.

Figure 2:
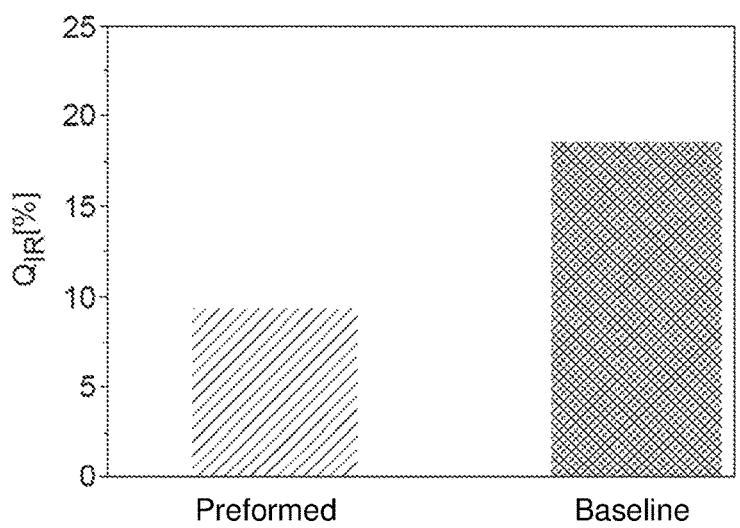
FIG. 2 shows the initial, irreversible capacity loss ($Q_{IR}$) of the electrodes in percent, according to FIG. 1.

With reference to FIG. 1, the improvement in the relative capacity of the electrode according to the invention in the first formation cycle is clearly apparent. In addition, the initial, irreversible capacity loss may be reduced from just below 20% to 9% by use of the method according to the invention (FIG. 2).

Example 2

2.1 In another exemplary embodiment, a silicon-based negative electrode precursor was manufactured from the same materials as in Example 1, and subsequently preformed, as a comparative electrode.

The electrode precursor obtained according to paragraph 1.2 in Example 1 was inserted into a button cell, using metallic lithium as a counter anode. Constant voltages of 1.5 V, 600 mV, and 300 mV were applied in succession to the silicon-based negative electrode precursor for 30 minutes in each case.

The silicon-based negative electrode precursor preformed in this way was removed from the button cell, washed with dimethyl carbonate, and installed in another button cell.

2.2 In addition, a silicon-based negative electrode according to the invention with the same formulation, manufacturing method, and preforming as described in Example 1, paragraphs 1.1 through 1.4 was manufactured.

2.3 The electrode that was preformed according to the invention (paragraph 2.2) as well as the electrode that was not preformed according to the invention (paragraph 2.1) were examined with regard to their half cell voltage and their capacity loss in the first formation cycle.

Figure 3:
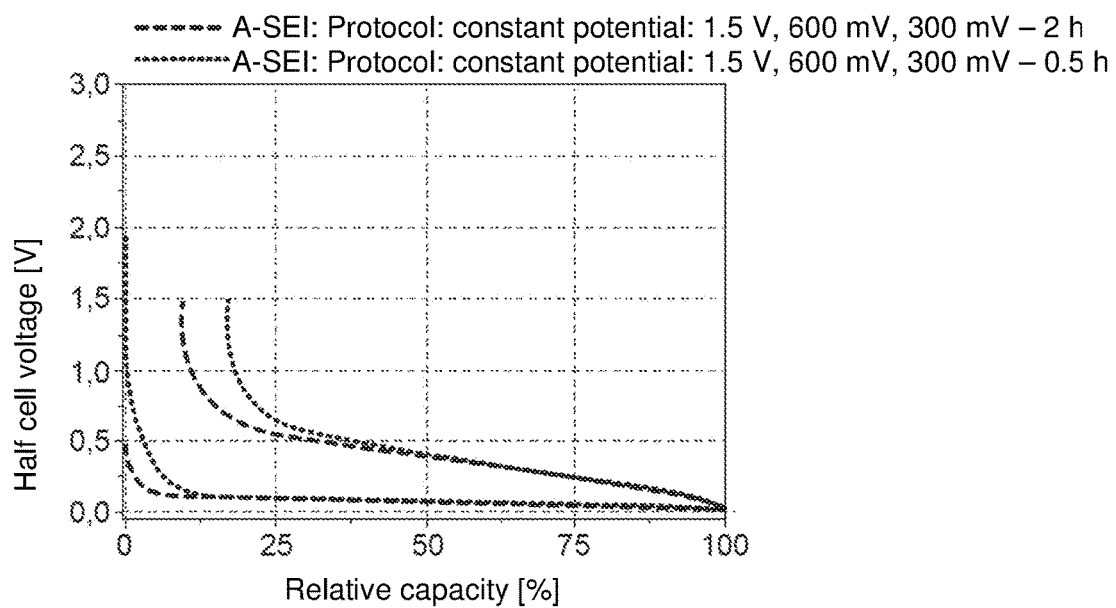
FIG. 3 shows the half cell voltage in volts in relation to the relative capacity (in percent (%)) during the first formation cycle. A preformed silicon-based negative electrode according to the invention (A-SEI, dashed line) obtained in method step c) is compared to an insufficiently preformed silicon-based negative electrode (A-SEI, dotted line). The half cell voltage in relation to the relative capacity during lithiation ((the left line in each case) and delithiation (the right line in each case) is illustrated.
Figure 4:
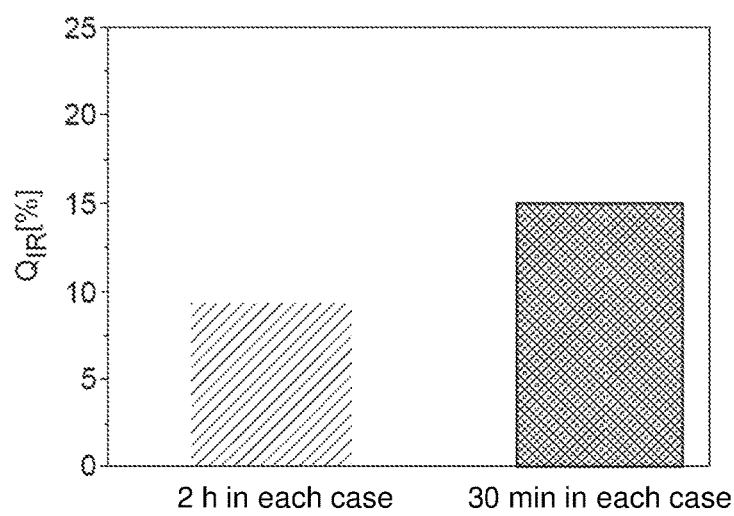
FIG. 4 shows the initial, irreversible capacity loss ($Q_{IR}$) of the electrodes in percent, according to FIG. 3.

2.4 As is apparent from FIG. 3, an electrode that is preformed according to the invention has a great improvement in its relative capacity in the first formation cycle, while an insufficiently preformed electrode (constant voltages for only 30 minutes in each case) has a much poorer relative capacity. In addition, according to FIG. 4 the initial, irreversible capacity loss of the electrode that is preformed according to the invention is much less than the irreversible capacity loss of the electrode that is not preformed according to the invention.

The invention claimed is:

1. A method for manufacturing at least one silicon-based negative electrode, wherein the method comprises the following method steps:
   a) providing at least one silicon-based negative electrode precursor, an electrolyte, and at least one lithium-based counter electrode,
   b) applying at least three successive constant voltages of 1.2 V-1.8 V, 400 mV-800 mV, and 200 mV-390 mV, respectively, between the at least one silicon-based negative electrode precursor and the at least one lithium-based counter electrode for a period of at least 35 minutes in each case, and
   c) obtaining the silicon-based negative electrode.

2. The method according to claim 1, wherein the three successive, constant voltages are 1.5 V, 600 mV, and 300 mV, respectively.

3. The method according to claim 1, wherein the lithium-based counter electrode is made of metallic lithium.

4. The method according to claim 1, wherein the respective successive, constant voltages in method step b) are applied for a period of 35 minutes to 14 hours in each case.

5. The method according to claim 1, wherein the three successive, constant voltages in method step b) are each applied for the same or different periods of time.

6. The method according to claim 5, wherein the successive, constant voltages in method step b) are each applied for exactly two hours.

7. The method according to claim 1, wherein the applied current corresponds to a C-rate of C/5 to C/20.

8. The method according to claim 7, wherein the applied current corresponds to a C-rate of C/10.

9. The method according to claim 1, wherein the silicon-based negative electrode precursor is a precursor of a silicon-based negative composite electrode.

10. The method according to claim 1, wherein the electrode material of the silicon-based negative electrode precursor contains active material and at least one binder.

11. The method according to claim 1, wherein the active material of the silicon-based negative electrode precursor contains or is made of silicon and graphite.

12. The method according to claim 1, wherein in method step c) the silicon-based negative electrode is obtained after washing with an organic wash solution and drying.

13. A silicon-based negative electrode that is manufacturable according to the method of claim 1.

14. A lithium-ion battery comprising at least one silicon-based negative electrode that is manufacturable according to the method of claim 1.

15. A device comprising at least one lithium-ion battery according to claim 14.

* * * * *